Aug. 15, 1950 W. P. DOOLEY 2,518,530
PRODUCTION OF SODIUM HYDROXIDE
Filed June 20, 1946 2 Sheets-Sheet 2

INVENTOR.
WILLIAM P. DOOLEY
BY
Thomas R. O'Malley

Patented Aug. 15, 1950

2,518,530

UNITED STATES PATENT OFFICE 2,518,530

PRODUCTION OF SODIUM HYDROXIDE

William P. Dooley, Dunbar, W. Va., assignor to American Viscose Corporation, Wilmington, Del., a corporation of Delaware Application June 20, 1946, Serial No. 677,969

6 Claims. (Cl. 23—185)

This invention relates to a continuous cyclic process for the conversion of sodium sulfate to sodium hydroxide.

The primary object of the invention is to provide an economical method for producing sodium hydroxide from Glauber's salt which is obtained in large amounts as a by-product in the manufacture of artificial fibers and other shaped articles from viscose, for example, and which is of relative unimportance commercially.

In the accompanying drawings.

Figure 1:
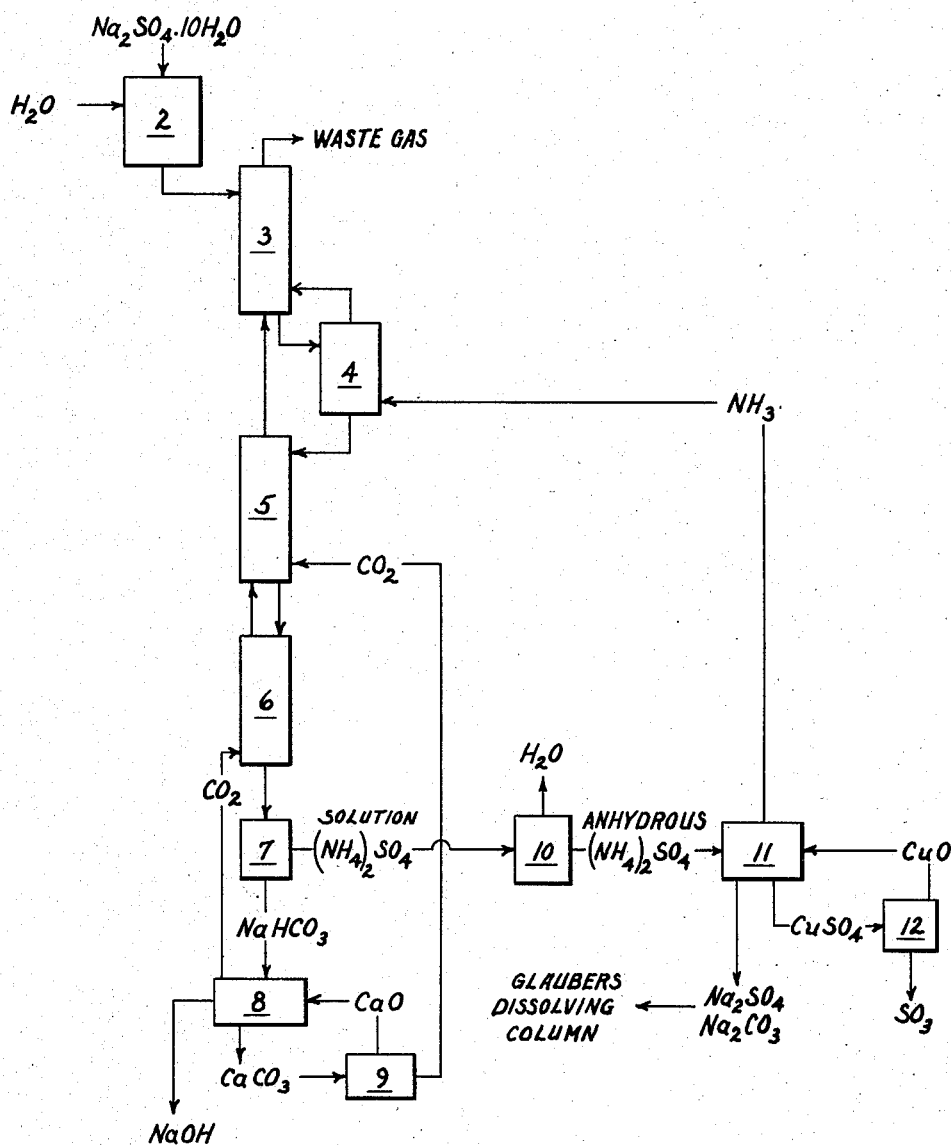
Figure 1 is a flow sheet illustrating one embodiment of the invention.

With reference more particularly to Figure 1, the hydrated sodium sulfate is introduced into a dissolving tower 2, where it is dissolved in water. The solution is pumped into a carbonating tower 3 in which it is carbonated and contacts ammonia introduced from a reactor 4. The ammoniacal solution is then pumped at a controlled rate into the reactor, in which it is saturated with ammonia. In reactor 4, the following reaction occurs

$$H_2CO_3 + NH_3 \rightarrow NH_4HCO_3$$

and the reactor contains the ions: sodium, ammonium, sulfate, carbonate and bicarbonate. The ammonia-saturated solution is pumped from reactor 4 through the carbonating towers 5 and 6, which are operated under pressure to increase the concentration of bicarbonate ion by solution of carbon dioxide. Carbon dioxide is forced in at the bottom of towers 5 and 6. The carbon dioxide, rising in towers 5 and 6, contacts the ammoniacal solution passing downwardly therethrough and unites with the ammonia to form ammonium bicarbonate. Preferably, an excess of carbon dioxide is used, to avoid expulsion of ammonia, and the temperature is controlled to prevent decomposition of the ammonium bicarbonate. The ammonia and carbon dioxide used for the formation of the ammonium bicarbonate are recovered at a subsequent stage of the process and are cycled back to the carbonating towers. By double decomposition between the sodium sulfate and ammonium bicarbonate, sodium bicarbonate and ammonium sulfate are formed in towers 5 and 6. The ammonium sulfate remains in solution, and the slurry containing the solid sodium bicarbonate is discharged at the bottom of tower 6. The carbonating towers 5 and 6 may be of any standard commercial type for achieving intimate contact between a descending liquor and an ascending vapor, and in which the passage of the slurry to the discharge end of tower 6 is not impeded. For example, the towers may be of the screen plate type in which the screen mesh is large enough for the solid sodium bicarbonate in the descending slurry to pass through, without blocking the screens. As will be understood by those skilled in the art, by forcing the $CO_2$ into towers 5 and 6 under pressure, and controlling the temperature in the carbonating towers 5 and 6, the concentration of the bicarbonate ion is increased with increase in the concentration of sodium bicarbonate in the liquid flowing downwardly through columns 5 and 6 until the solubility limit is exceeded and the sodium bicarbonate is precipitated. Waste gas is withdrawn at the top of tower 3.

The sodium bicarbonate is separated from the mother liquor containing the ammonium sulfate, as by means of filter 7, the mother liquor being continuously withdrawn for working up for regeneration of the ammonia and recovery of sulfur, as will be described more in detail hereinafter. The sodium bicarbonate may be pumped into a heater 8 in which it is reacted either as such or after conversion to the carbonate, with calcium oxide, in the presence of steam, at a temperature in excess of about 318° C., to form, by solid phase reaction, liquid sodium hydroxide and calcium carbonate, with evolution of carbon dioxide. By leaching the reaction product with water, the sodium hydroxide is removed in solution, and the calcium carbonate is precipitated.

Instead of reacting the sodium bicarbonate with calcium oxide directly, it may be converted to sodium carbonate, by heating it in heater 8, to a temperature of about 270° C. to 350° C., with evolution of carbon dioxide, and the carbonate may then be reacted with calcium oxide, in aqueous medium, to precipitate calcium carbonate and form an aqueous solution of sodium hydroxide.

In either case, the precipitated calcium carbonate is filtered off and is forwarded to a lime kiln 9 where it is decomposed to calcium oxide and carbon dioxide, the calcium oxide being cycled back to heater 8 for reaction with further quantities of sodium bicarbonate or carbonate, and the carbon dioxide being cycled back to carbonating towers 5 and 6. The sodium hydroxide solution may be used as such, or it may be evaporated to dryness.

Concurrently with working up of the sodium bicarbonate to sodium hydroxide, the mother liquor remaining after separation therefrom, which contains ammonium sulfate and, usually, smaller quantities of ammonium bicarbonate, sodium bicarbonate and sodium sulfate, is worked up for the regeneration of ammonia and recovery of sulfur, the ammonia being recycled to the ammonia reactor 4 for use in saturating further quantities of sodium sulfate solution.

The ammonia regeneration and sulfur recovery may be effected in several ways. In accordance with the embodiment of the invention, illustrated in Figure 1, the effluent from filter 7 is evaporated in an evaporator 10, and the resulting anhydrous material is introduced into a heater 11, where it is heated, preferably at a temperature of about 2000° C., with a metallic oxide, the corresponding sulfate of which decomposes at a temperature below 1000° C., or the sulfate of which forms sulfur trioxide on heating, such as cupric or ferric oxide, to form the corresponding metal sulfate and evolve the ammonia. The ammonia is recycled to the reactor 4, and the metal sulfate is calcined in a roaster 12, to re-form the metal oxide with release of sulfur trioxide. The metal oxide is discharged from the roaster and recycled to heater 11. The sulfur trioxide may be absorbed in dilute sulfuric acid for the production of concentrated sulfuric acid, if desired. Any sodium sulfate and sodium carbonate remaining after heating of the evaporated effluent with the metal oxide are withdrawn from heater 11 and forwarded to the dissolving column 2.

Figure 2:
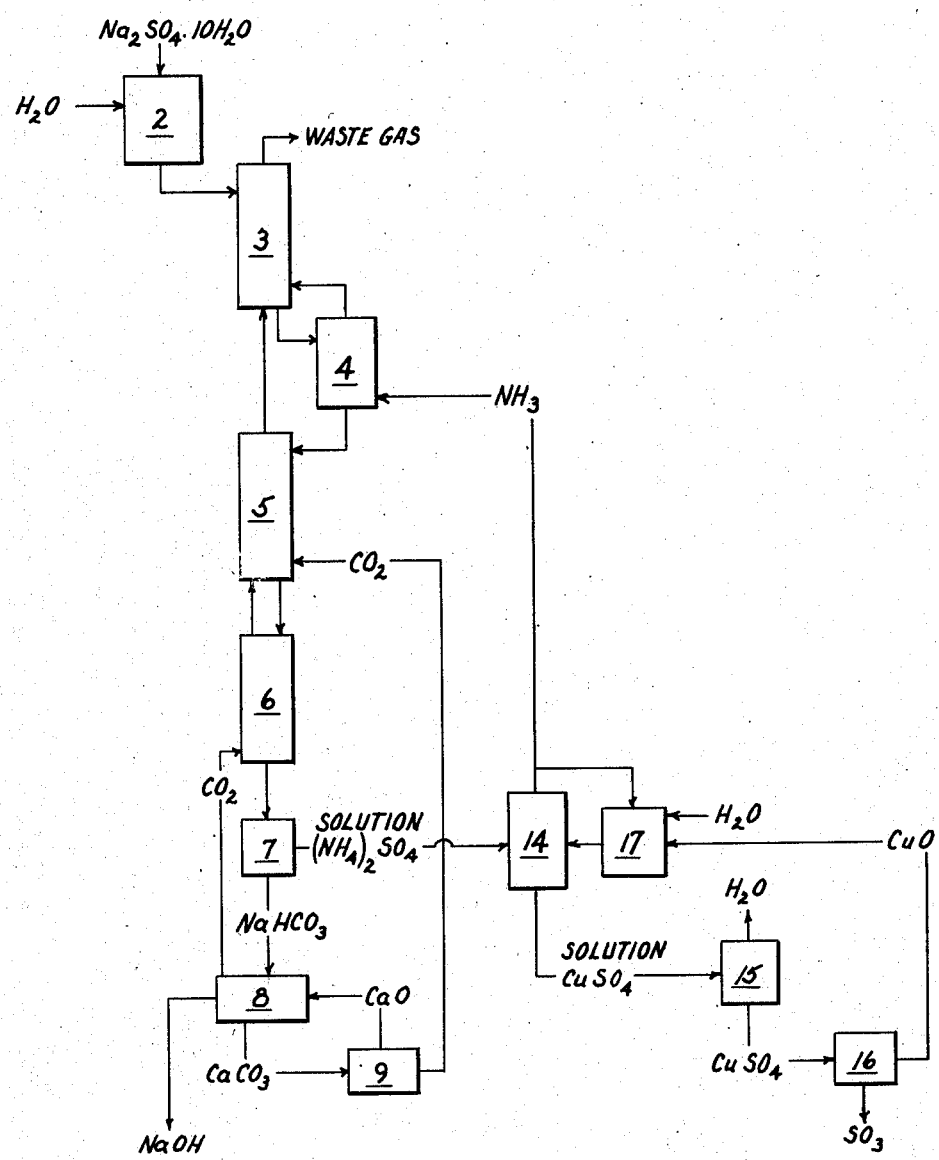
Figure 2 is a flow sheet illustrating another embodiment of the invention.

In accordance with the modification of the invention illustrated in Figure 2, the effluent from filter 7 is reacted, in heater 14, with the aqueous ammonium complex of a metal hydroxide, for example cuprammonium hydroxide, nickel ammonium hydroxide, cadmium amonium hydroxide, silver ammonium hydroxide, zinc ammonium hydroxide, etc., to form a solution of the metal sulfate, with evolution of ammonia. The metal sulfate solution is evaporated in evaporator 15, and the anhydrous sulfate is introduced into a roaster 16, and decomposed to the metal oxide and sulfur trioxide. The metal oxide is recycled to a vessel 17 in which it is reacted with water and a portion of the ammonia issuing from heater 14 to re-form the aqueous ammonium complex of the metal hydroxide, which is then introduced into heater 14 for reaction with further quantities of effluent from filter 7. The remaining portion of the evolved ammonia is recycled to the reactor 4.

It will be noted that, in carrying out the described process, all of the reagents are recovered and reused without loss, the process being operated on a continuous cyclic basis with marked efficiency and economy. No by-product is obtained which is not recycled for reuse directly in the form obtained or after reaction with other substances recovered during the process.

While I have described my process in terms of particular steps as carried out in the preferred practice of the invention, it is to be understood that it may be varied in details without departing from the spirit and scope of the invention as defined by the appended claims.

I claim:

1. In a process for the production of sodium hydroxide from sodium sulfate, the steps which comprise carbonating an aqueous solution of the sodium sulfate, saturating the solution with ammonia, carbonating the ammoniacal solution to produce a slurry containing sodium bicarbonate, separating the sodium bicarbonate from the slurry, and converting the sodium bicarbonate to sodium hydroxide.

2. In a process for the production of sodium hydroxide from sodium sulfate, the steps which comprise carbonating an aqueous solution of the sodium sulfate, saturating the solution with ammonia, carbonating the ammoniacal solution to produce a slurry containing sodium bicarbonate, separating the sodium bicarbonate from the slurry, heating the sodium bicarbonate with calcium oxide in the presence of steam at a temperature in excess of 318° C. to form, by solid phase reaction, sodium hydroxide and calcium carbonate, and leaching the reaction product with water to dissolve the sodium hydroxide and precipitate the calcium carbonate.

3. In a process for the production of sodium hydroxide from sodium sulfate, the steps which comprise carbonating an aqueous solution of the sodium sulfate, saturating the solution with ammonia, carbonating the ammoniacal solution to produce a slurry containing sodium bicarbonate, separating the sodium bicarbonate from the slurry, heating the sodium bicarbonate to obtain sodium carbonate, and reacting the sodium carbonate with calcium oxide in aqueous medium, to form an aqueous solution of sodium hydroxide and precipitate calcium carbonate.

4. In a process for the production of sodium hydroxide from sodium sulfate, the steps which comprise carbonating an aqueous solution of the sodium sulfate, saturating the carbonated solution with ammonia, passing the ammoniacal solution downwardly countercurrent to ascending vapors of carbon dioxide whereby the ammoniacal solution is carbonated and a slurry containing sodium bicarbonate is produced, separating the sodium bicarbonate from the slurry, and converting the sodium bicarbonate to sodium hydroxide.

5. A cyclic process for the production of sodium hydroxide from sodium sulfate which comprises carbonating an aqueous solution of the sodium sulfate, saturating the carbonated solution with ammonia, carbonating the ammoniacal solution to produce a slurry containing sodium bicarbonate, separating the sodium bicarbonate from the slurry to obtain the bicarbonate and a solution containing ammonium sulfate, reacting the sodium bicarbonate with calcium oxide in the presence of steam, at a temperature of 318° C. to produce liquid sodium hydroxide and calcium carbonate with evolution of carbon dioxide, cycling the evolved carbon dioxide for carbonating further quantities of the ammonia-saturated carbonated sodium sulfate solution, leaching the reaction product comprising liquid sodium hydroxide with water to dissolve the sodium hydroxide and precipitate calcium carbonate, separating the sodium hydroxide solution from the calcium carbonate, converting the calcium carbonate by heat to calcium oxide and carbon dioxide, cycling the calcium oxide for use in converting further quantities of sodium bicarbonate to sodium hydroxide, cycling the carbon dioxide evolved for carbonating further quantities of the ammoniacal solution, evaporating the ammonium sulfate-containing liquor separated from the sodium bicarbonate, heating the residue of the evaporation with a metallic oxide the corresponding sulfate of which decomposes at a temperature below 1000° C. to evolve ammonia and produce the metal sulfate, cycling the ammonia for saturating further quantities of carbonated sodium sulfate solution, heating the metal sulfate to recover the metal oxide and produce sulfur oxide, and cycling the metal oxide for reaction with further quantities of the residue remaining after evaporation of the ammonium sulfate-containing solution separated from the sodium bicarbonate.

6. A cyclic process for the production of sodium hydroxide from sodium sulfate which comprises carbonating an aqueous solution of the sodium sulfate, saturating the carbonated solution with ammonia, carbonating the ammoniacal solution to produce a slurry containing sodium bicarbonate, separating the sodium bicarbonate from the slurry to obtain the bicarbonate and a solution containing ammonium sulfate, converting the sodium bicarbonate by heat to sodium carbonate with evolution of carbon dioxide, reacting the carbonate with calcium oxide in aqueous medium to produce an aqueous solution of sodium hydroxide and precipitate calcium carbonate with evoluton of carbon dioxide, cycling the carbon dioxide for use in carbonating further quantities of the ammonia-saturated carbonated sodium sulfate solution, separating the sodium hydroxide solution, converting the calcium carbonate by heat to calcium oxide, cycling the calcium oxide for reaction with further quantities of sodium carbonate, evaporating the ammonium sulfate-containing liquor separated from the sodium bicarbonate, heating the residue of the evaporation with a metallic oxide the corresponding sulfate of which decomposes at a temperature below 1000° C. to evolve ammonia and produce the metal sulfate, cycling the ammonia for saturating further quantities of carbonated sodium sulfate solution, heating the metal sulfate to recover the metal oxide and produce sulfur oxide, and cycling the metal oxide for reaction with further quantities of the residue remaining after evaporation of the ammonium sulfate-containing solution separated from the sodium bicarbonate.

WILLIAM P. DOOLEY.

REFERENCES CITED

The following references are of record in the file of this patent:

UNITED STATES PATENTS

| Number | Name | Date |
| --- | --- | --- |
| 623,154 | Howard | Apr. 18, 1899 |
| 697,465 | Frasch | Apr. 15, 1902 |
| 1,249,314 | Bradley | Dec. 11, 1917 |
| 1,294,526 | Vis | Feb. 18, 1919 |
| 2,180,755 | Garrels et al. | Nov. 21, 1939 |
| 2,189,826 | Windecker | Feb. 13, 1940 |

FOREIGN PATENTS

| Number | Country | Date |
| --- | --- | --- |
| 8,413 | Great Britain | 1840 |

OTHER REFERENCES

"The Alkali Industry" by Partington; Baillere, Tindall and Cox, London, 1919, page 74.

"Handbook of Chemistry and Physics," Chemical Rubber Publishing Co., Cleveland, Ohio, 28th edition (1944), pp. 488–489, 380–381.